United States Patent

[11] 3,564,254

| [72] | Inventors | Melvin P. Siedband;<br>Jack L. James, Baltimore, Md. |
|---|---|---|
| [21] | Appl. No. | 745,534 |
| [22] | Filed | July 17, 1968 |
| [45] | Patented | Feb. 16, 1971 |
| [73] | Assignee | Westinghouse Electric Corporation<br>Pittsburgh, Pa.<br>a corporation of Pennsylvania |

[54] SPIN MOTOR CONTROLLER FOR A ROTATING ANODE MOTOR OF AN X-RAY GENERATOR TUBE
19 Claims, 2 Drawing Figs.

| [52] | U.S. Cl. | 250/93,<br>250/95 |
|---|---|---|
| [51] | Int. Cl. | H05g 1/00 |
| [50] | Field of Search | 250/93, 102 |

[56] References Cited
UNITED STATES PATENTS

| 2,642,540 | 6/1953 | Berindei et al. | 250/93 |
|---|---|---|---|
| 3,043,957 | 7/1962 | Graves | 250/93 |
| 3,244,884 | 4/1966 | McLaughlin | 250/93 |
| 3,428,809 | 2/1969 | Daniels et al. | 250/102 |

*Primary Examiner*—James W. Lawrence
*Assistant Examiner*—C. E. Church
*Attorneys*—F. H. Henson and E. P. Klipfel

ABSTRACT: A solid state spin motor controller responsive to monostable multivibrator circuitry for starting the motor, sensing that the motor has come up to speed properly, and preventing the application of excitation to the anode of the X-ray generator tube in the event the motor has not properly come up to speed or fails to operate continuously.

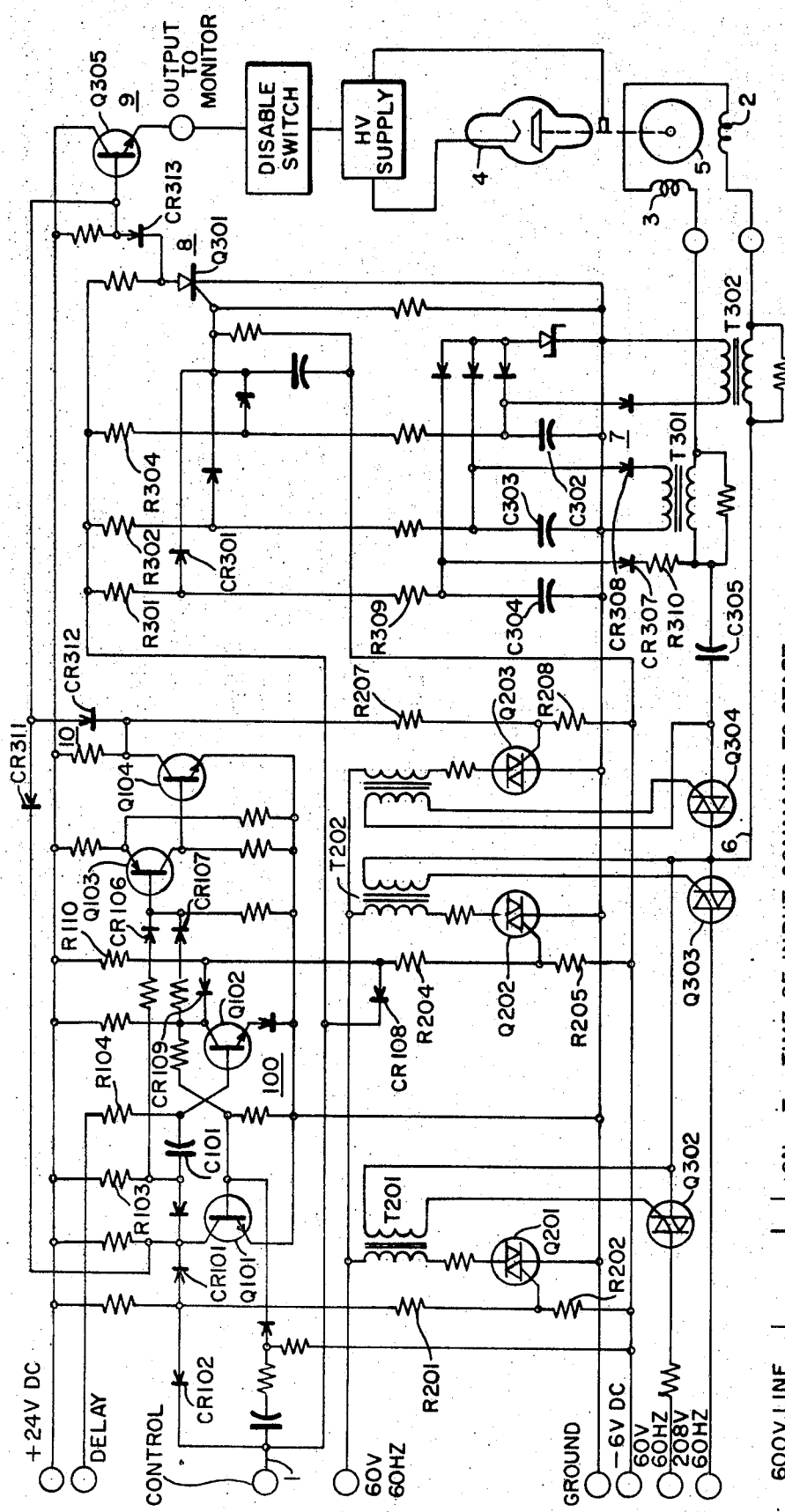

SPIN MOTOR CONTROLLER FOR A ROTATING ANODE MOTOR OF AN X-RAY GENERATOR TUBE

BACKGROUND OF THE INVENTION

1. Field of the Invention

The present invention relates generally to spin motor starters and more particularly relates to a spin motor controller for a rotating anode motor of an X-ray generator tube.

2. Description of the Prior Art

X-ray generator tubes often incorporate a rotating anode in order to allow for higher instantaneous anode dissipation than is possible with a fixed anode. The tubes are so constructed that the anode is directly attached to a shaft which in turn is fixed to a motor armature. The entire assembly is mounted on silver alloy bearings and is within the vacuum enclosure of the tube. The sealed anode armature is placed within split phase motor windings which provide the power for rotating the armature and therefore the anode assembly. If this were a normal motor application, a centrifugal switch would be attached to the armature to determine that the motor has reached proper speed and so reduce the starting current to the windings. However, the sealed armature-anode assembly dictates that some other means be used to sense that the motor has come up to speed.

Controllers of the prior art utilized in this application are bulky, expensive and subject to fluctuating time functions due to spurious events which commonly occur in electromagnetic relays and electronic tubes such as thyratrons.

An object of the present invention is to provide a solid state spin motor controller for an X-ray generator tube which is inexpensive, lightweight and provides a very high reliability.

Another object of the present invention is to provide a spin motor controller for a rotating anode motor of an X-ray generator tube which dissipates less heat and operates more efficiently than controllers heretofore available.

Another object of the present invention is to provide a spin motor controller which is greatly simplified in its operation to facilitate ease of manufacturing, installation and maintenance.

SUMMARY OF THE INVENTION

Briefly, the present invention accomplishes the above cited objects and other objects and advantages by providing a monostable multivibrator circuit and semiconductor devices in combination with diode logic for starting the motor which drives the rotating anode of an X-ray tube. It is a solid state system which uses no moving parts and no relays. In addition to providing power for starting the motor, it also senses that the motor has come up to speed properly and provides an output signal which will prevent the application of anode excitation to the X-ray generator tube in the event the motor has not properly come up to speed or fails to operate continuously.

More particularly, a monostable multivibrator is provided having a stable state but being responsive to an input signal to assume an unstable state from which it returns and having a recovery state during its return to the stable state. The monostable multivibrator returns to its stable state after a length of time depending on the discharging time of a capacitor within the multivibrator. The recovery state of the multivibrator is determined by the time required to recharge this capacitor.

The controller of the spin motor is operable in an overvoltage mode for starting the motor, in a running voltage mode when the motor should be up to speed, and a checking mode for preventing the application of excitation to the anode of the X-ray generator tube in the event the motor has not properly come up to speed or fails to operate continuously. The modes of the controller are responsive to the aforementioned states of the monostable multivibrator.

BRIEF DESCRIPTION OF THE DRAWING

Further objects and advantages of the present invention will be readily apparent from the following detailed description taken in conjunction with the drawing, in which:

FIG. 1 is an electrical schematic diagram of an illustrative embodiment of the present invention; and FIG. 2 is a graphical representation of waveforms which occur at selected points in the illustrative embodiment of FIG. 1.

Referring to FIG. 1, the sequence of operation can be broadly described as follows: A control line 1 is energized from zero to +24volts which causes overvoltage to be applied to a fixed phase winding 2 and shifted phase winding 3 of the anode spin motor which drives the rotating anode of an X-ray generator tube 4. After a selected time period of between 1 and 5seconds, which is required by the armature winding 5 and the motor characteristics, the voltage shifts from an overvoltage mode (normally 208volts) to a running voltage mode (approximately 60volts) at which time the shifted phase winding 3 is disconnected from its power source 6 and is examined by voltage sensing circuit 7. If voltage is present on the shifted phase winding 3, it indicates that the anode motor is rotating, since there will be very little energy coupled to the shifted phase winding unless the motor is indeed rotating. The sensed voltage inhibits a latching circuit 8 which would otherwise prevent the application of anode voltage to the generator tube 4. The sensed back emf in the shifted phase winding 3 is utilized to inhibit the prevent circuit 8. In addition to the back emf induced in the shifted phase winding 3, current of the shifted phase winding and current of the fixed phase winding 2 are sensed by the same circuit 7. In addition, the fact that the cycle of operation has been completed is also sensed by circuit 10. If all functions are correct, the logic of the latching circuit 8 permits the main X-ray control circuit 9 to be energized by means in some form of external logic. In the event the motor fails or power is removed, the sensing circuit 7 will prevent excitation of the anode and therefore prevent generation of X-rays.

More particularly, and again referring to FIG. 1, assume initially that all of the lines to the controller are energized except the control line 1 which is at ground potential. When the monostable multivibrator 100, consisting of transistor Q101 and a transistor Q102, is in its stable state, transistor Q101 is turned off and transistor Q102 is energized. Because the control line 1 is at zero potential, diodes CR102 and CR108 affect the bias of the semiconductor bidirectional switches Q201 and Q202 so that both these silicon switches are deenergized and the main semiconductor switching devices Q302 and Q303 which feed power to the anode spin motor are also deenergized.

The condition of the control line 1 is such that no power is applied to the latching circuit 8 and more particularly an SCR switch Q301. This in turn keeps the logic circuitry 9 and a transistor device Q305 in a deenergized condition. The transistor or semiconductor device Q305 has zero emitter volts which it is turned off.

Energizing the control line 1 feeds an input signal to the base electrode of the transistor Q101, which causes the multivibrator 100 to flip over to its unstable state. This action, coupled to diode CR101 inhibits the operation of a bidirectional switch Q201 so that a power switch Q302 will not be energized. However, the change to an unstable state by the multivibrator 100 through transistor Q102 is diode coupled by diode CR109 to a biasing network made up of resistors R110, R204 and R205. The bias network feeds a bidirectional switch Q202 causing it to turn on which in turn feeds a gate signal to a power bidirectional switch Q303. The switch Q303 connects the 208 volt line to the fixed phase winding 2 of the anode spin motor. In addition, a diode CR107 feeds a turn-off signal to an amplifier circuit including transistor Q103, which in turn feeds a turn-off signal to a voltage detector including transistor Q104. The transistor Q104 then allows the bias to change on a bidirectional switch Q203 such that it becomes energized. The switch Q203 couples a gate signal to a bidirectional switch Q304 which in turn becomes energized and which will then feed 208 volts through a phase shifting capacitor C305 to the shifted phase winding 3 of the anode spin motor.

During the time that the monostable multivibrator 100 is in its unstable state, a time delay means in the form of an energy storage device utilizes a capacitor C101 to be slowly discharging through a resistor R104. An external resistor network may be advantageously utilized in conjunction with the resistor R104 if it is desirable to slow down the operation of the multivibrator 100 to a greater degree.

When the multivibrator 100 returns to its stable state, the positive voltage on the diode CR107 is removed but at this time, during which the monostable multivibrator is in its recovery state, the voltage on a diode CR106 is not yet positive enough to keep the transistors Q103 and Q104 turned off. Until the capacitor C101 attains a predetermined charge there will be no signal through the diode CR106 to the amplifier and voltage detector circuits. The length of time required to recharge the capacitor C101 through resistor R103 determines the recovery state of the monostable multivibrator circuit 100.

Upon sufficient charge being accumulated by the capacitor C101, the recovery state of the multivibrator 100 is completed and the voltage on the diode CR106 will now be sufficient to turn off the transistor devices Q103 and Q104.

During the recovery state when the transistor Q104 is conducting, the semiconductor switch Q304 is deenergized thereby disconnecting the shifted phase winding 3 from the controller or power lines.

However, if the motor is rotating, voltage will be coupled from the fixed phase winding 2 through the armature 5 to the shifted motor phase winding 3. This voltage is sensed by means of a resistor R310 and diode CR307 to maintain a charge on a capacitor C304.

If no voltage is present or sensed, the capacitor C304 would have been allowed to discharge so that the current through a resistor R301 and resistor R309 would allow conduction through a diode CR301 to energize the controlled rectifier Q301. The controlled rectifier Q301, having once been energized, cannot be turned off except by switching the control voltage once again to zero volts and repeating the turn-on cycle. The direct current voltage from the control line 1 will continue until the entire circuit is recycled once more.

The recovery state of the multivibrator 100 is terminated upon completion of the recharging of the capacitor C101 in the multivibrator. When the capacitor C101 attains this charge level, the diode C106 will be caused to conduct and transistor Q103 will again be deenergized so that transistor Q104 is also deenergized. The switch Q203 is then energized through the biasing network R207 and R208 to return the bidirectional switch Q304 to its on-position thereby allowing the fixed phase winding 3 to be once again connected to the main power. But now the main power has been switched to the running voltage shown as 60 volts.

The switch to the running mode by the controller is accomplished by the change of state between transistors Q101 and Q102 which resulted from the monostable multivibrator 100 returning to its stable state.

Upon the monostable multivibrator 100 returning to its stable state the transistor Q101 returns to its off-condition thereby switching on the bidirectional switch Q201 through its biasing network made up of R201 and R202. At the same time, the transistor Q102 operating through the biasing network R204 and R205 causes the bidirectional switch Q202 to be nonconductive or off. The action of the bidirectional switches Q201 and Q202 then result through coupling transformers T201 and T202 respectively in the bidirectional power switch Q302 being energized and assuming its on-position and the bidirectional power switch Q303 being deenergized and assuming its off-position. The result is that the motor will now be operating on the 60 volt line instead of the 208 volt line.

Current being drawn by the motor is sensed by transformers T301 and T302 so that as the motor continues its operation, the shifted phase voltage is sensed by charge accumulating on the capacitor C304, the shifted phase current is sensed by charge accumulating on a capacitor C303 and the fixed phase current is sensed by charge accumulating on a capacitor C302. The information which is sensed is then summed at a summing junction at the gate electrode of the control rectifier Q301. When the sum is equal to a predetermined value, control voltage from the control line 1 will be blocked from the gate electrode of the controlled rectifier Q301 by means of the summing resistors R301, R302, and R304. As long as the latching circuit 8 including controlled rectifier Q301 stays deenergized the indication is that the anode spin motor is operating properly.

The output of controlled rectifier Q301, the collector of transistor Q101 in the monostable multivibrator 100, and the collector electrode of the transistor Q104 in the voltage detector are diode coupled through diode CR313, CR311 and CR312 respectively to an output transistor Q305. During the unstable state of the multivibrator 100, the transistor Q101 and transistor Q104 keep the output transistor Q305 deenergized. It is during the unstable state of the multivibrator that the initial motor starting cycle occurs and at which time application of excitation to the anode voltage is to be prevented.

Should the controller fail to complete the start cycle or should any current or voltage appropriate to the operation of the motor be interrupted, as determined by the voltage sensing circuit and the two current transformers of the circuit 7, the output transistor Q305 will become deenergized and will prevent the application of excitation to the anode of the X-ray generator tube.

Thus, it is readily apparent that the present invention offers the advantage of lightweight, low cost, minumum heat dissipation and very high reliability. Troublesome relays and thyratrons, for obtaining a timing function as well as for switching, have been eliminated.

The controller in accordance with the present invention is readily applied to a printed circuit card capable of insertion into a card cage to permit rapid replacement and repair of X-ray apparatus in the field. A single card can contain the components of the controller circuitry with the exception that power components and current sensing transformers may be more advantageously mounted on a chassis external to the card.

FIG. 2 illustrates waveforms and representative times which occur at selected points during the operation of the illustrative embodiment shown in FIG. 1. $T_1$ indicates the occurrence of an input signal to the monostable multivibrator 100 to command start-up of the controller. The starting or overvoltage mode occurs during the time $T_2-T_1$ during which the multivibrator is in its unstable state. The unstable state of the multivibrator is readily controlled and is selected to be of a time which is sufficient for the anode spin motor to attain proper speed. The time delay is determined by the armature inertia and the characteristics of the spin motor and is set in accordance with the discharging rate of capacitor C101. The recovery state of the monostable multivibrator occurs during the time $T_3-T_2$ and can be set in accordance with the recharging rate of the capacitor C101. It is during this recovery state that the controller senses the induced back emf in the shifted phase winding 3 to determine whether the motor is up to proper speed. Should a satisfactory determination of motor speed be made, then excitation to the anode of the X-ray generating tube is allowed.

While the present invention has been described with a degree of particularity, for the purposes of illustration, it is to be understood that all modifications, alterations or substitutions within the spirit and scope of the present invention are herein meant to be included.

We claim:

1. In a spin motor controller for a rotating anode motor of an X-ray generator tube wherein the motor has at least two windings displaced in phase, the combination comprising: monostable multivibrator means having a stable state but being responsive to an input signal to assume an unstable state from which it returns and a recovery state during its return to said stable state; said monostable multivibrator means including first and second cross connected switching devices and time delay means interconnecting said switching devices; said time delay means connected to determine the time said multivibrator means is in its unstable state and to determine the time said monostable multivibrator means is in its recovery state; means for providing an input signal to said monostable multivibrator means; means for providing a starting voltage to said windings when said monostable multivibrator means is in said unstable state, and means responsive to the back emf induced in the one of said windings by the other when said monostable multivibrator means is in said recovery state for determining motor speed before energizing the anode of said X-ray generator tube.

2. The circuitry of claim 1 wherein said time delay means including energy storage means connected to discharge energy to determine the time said multivibrator means is in its unstable state and to store energy to determine the time said monostable multivibrator means is in its recovery state.

3. The circuitry of claim 2 wherein said energy storage means includes capacitive means.

4. The combination of claim 1 wherein said two windings are a shifted phase winding and a fixed phase winding.

5. The combination of claim 1 wherein said two windings are a shifted phase winding and a fixed phase winding; and said means for determining motor speed includes means for disconnecting said shifted phase winding during the recovery state of said monostable multivibrator means; and means for sensing back emf induced in said shifted phase winding by said fixed phase winding.

6. The combination of claim 5 including latching means responsive to said means for sensing back emf for preventing excitation of said anode should the sensed back emf indicate the motor is not up to proper speed.

7. The combination of claim 1 wherein said means for providing a starting voltage to said windings includes a first bidirectional semiconductor switching means and a second bidirectional semiconductor switching means responsive to the unstable state of said monostable multivibrator means for connecting said starting voltage to said phase displaced windings.

8. The combination of claim 7 wherein said second switching means disconnects one of said windings when said monostable multivibrator means is in its recovery state.

9. The combination of claim 8 wherein said second switching means reconnects said one of said windings after the recovery state of said monostable multivibrator means.

10. The combination of claim 1 wherein said means for providing a running voltage to said windings includes a bidirectional semiconductor switching means for connecting a running voltage to said windings when said monostable multivibrator means returns to said stable state.

11. The combination of claim 10 including another bidirectional semiconductor switching means which is inhibited by the unstable state of said monostable multivibrator means to prevent energization of said third switching means.

12 The combination of claim 7 including yet another bidirectional semiconductor switching means which is responsive to the unstable state of said multivibrator means for energizing said first switching means to connect over voltage to the other of said windings.

13. The combination of claim 7 including yet another bidirectional semiconductor switching means, amplifier means and voltage detector means; said yet another switching means responsive to said amplifier means and voltage detector means for energizing said second semiconductor means to control the voltage to said one of said phase windings.

14. The combination of claim 13 wherein said amplifier means includes a semiconductor device responsive to the return of said monostable multivibrator means to said stable state for amplifying a voltage signal to said voltage detector means.

15. The combination of claim 14 wherein said voltage detector means includes the second semiconductor device responsive to the voltage output from said amplifier means exceeding a predetermined value for energizing said yet another semiconductor switching means and hence closing said second semiconductor switching means.

16. The combination of claim 5 including controlled rectifier means responsive to the absence of a back emf in said shifted phase winding during the unstable state of said monostable multivibrator means for preventing application of excitation to said anode means responsive to the back emf during the unstable state of said monostable multivibrator means for preventing application of excitation to said anode in the absence of a back emf indicative of the motor not being up to proper speed.

17. The combination of claim 16 including means for preventing application of said excitation until another input signal is initiated.

18. The apparatus of claim 16 including a third semiconductor device responsive to the condition of said controlled rectifier means, the condition of one switch of the monostable multivibrator means, and the condition of said means for sensing back emf for controlling excitation to said anode.

19. The apparatus of claim 16 including additional energy storage means connected to sense the back emf through said shifted phase winding, to sense the current through said shifted phase winding and to sense current through said fixed phase winding for determining when each sensed quantity is present.